United States Patent
Park et al.

(10) Patent No.: US 9,619,086 B2
(45) Date of Patent: Apr. 11, 2017

(54) DISPLAY DEVICE WITH TOUCH SCREEN AND METHOD OF DRIVING THE SAME

(71) Applicant: LG DISPLAY CO., LTD., Seoul (KR)

(72) Inventors: Jae-Hyun Park, Gwangju-si (KR); Jung-Seok Seo, Daejeon-si (KR)

(73) Assignee: LG Display Co., Ltd., Seoul (KR)

( * ) Notice: Subject to any disclaimer, the term of this patent is extended or adjusted under 35 U.S.C. 154(b) by 234 days.

(21) Appl. No.: 13/727,810

(22) Filed: Dec. 27, 2012

(65) Prior Publication Data
US 2014/0043284 A1 Feb. 13, 2014

(30) Foreign Application Priority Data
Aug. 8, 2012 (KR) ........................ 10-2012-0086790

(51) Int. Cl.
G06F 3/044 (2006.01)
G06F 3/046 (2006.01)
G06F 3/041 (2006.01)

(52) U.S. Cl.
CPC .............. *G06F 3/044* (2013.01); *G06F 3/046* (2013.01); *G06F 3/0416* (2013.01); *G06F 2203/04106* (2013.01)

(58) Field of Classification Search
CPC ..................... G06F 3/044; G06F 3/046; G06F 2203/04106; G06F 3/0416
USPC .................................................. 345/173–174
See application file for complete search history.

(56) References Cited

U.S. PATENT DOCUMENTS

| 8,274,496 | B2 * | 9/2012 | Ung | G06F 3/03545 178/18.03 |
|---|---|---|---|---|
| 2011/0141042 | A1 * | 6/2011 | Kim et al. | 345/173 |
| 2012/0169400 | A1 * | 7/2012 | Liu | 327/517 |
| 2013/0181937 | A1 * | 7/2013 | Chen | G06F 3/044 345/174 |
| 2013/0265276 | A1 * | 10/2013 | Obeidat | G06F 3/044 345/174 |

FOREIGN PATENT DOCUMENTS

| CN | 101667085 A | 3/2010 |
|---|---|---|
| KR | 10-1209514 B1 | 12/2012 |

OTHER PUBLICATIONS

KIPO: Office Action for Korean Patent Application No. KR 10-2012-0086790—Issued on Oct. 31, 2013.
Chinese Office Action dated Nov. 27, 2015, in Chinese Patent Application No. 201210568734.0.
Chinese Office Action dated Jun. 24, 2016, in Chinese Patent Application No. 201210568734.0.

\* cited by examiner

*Primary Examiner* — Kwin Xie
(74) *Attorney, Agent, or Firm* — Morgan, Lewis & Bockius LLP

(57) ABSTRACT

A display device with a touch screen and a method of driving the same are provided. In a method of driving a display device including a touch screen including a plurality of sensing electrode lines and driving electrode lines and operating as an electromagnetic touch mode or a capacitive touch mode according to an input touch signal, the method includes: determining the input touch signal, controlling whether to connect pairs of sensing electrode lines among the sensing electrode lines, and controlling whether to connect pairs of driving electrode lines among the driving electrode lines, according to the touch signal.

19 Claims, 11 Drawing Sheets

DISPLAY DEVICE WITH TOUCH SCREEN AND METHOD OF DRIVING THE SAME

CROSS-REFERENCE TO RELATED APPLICATION(S)

This application claims the benefit under 35 U.S.C. §119(a) of Korean Patent Application No. 10-2012-0086790, filed on Aug. 8, 2012, in the Korean Intellectual Property Office, the entire disclosure of which is incorporated by reference herein for all purposes.

BACKGROUND

1. Technical Field

The following description relates to a display device, and more particularly, to a display device with a touch screen and a method of driving the same.

2. Discussion of the Related Art

Various input devices are being applied to various electronic systems including computers (for example, laptop computers, tablet computers, and personal digital computers) and communication equipment (for example, portable terminals and handheld communication equipment).

In various input devices, a capacitive touch screen is an input device that detects the position of a near object such as a finger, senses capacitive change that is caused by the near object, and thus determines a touched position.

A digitizer or a tablet personal computer (PC) is an input device that determines a position touched by a position indicator which is realized as a drawing device such as a stylus or a pen-shaped object, e.g. a pen.

Generally, digitizers have excellent position detection accuracy and resolution as compared to general touch sensors, but have a drawback in that the digitizers require an input-dedicated position indicator (e.g., a stylus or a pen). Therefore, it is required to combine an attribute (for example, convenience) of a touch sensor with the improved accuracy and resolution of the digitizer.

Hereinafter, a related art display device that enables the use of a finger and a pen will be described with reference to FIG. 1.

FIG. 1 is a sectional view illustrating a panel part (P) of a related art display device with a touch screen.

As illustrated in FIG. 1, the panel part (P) of the related art display device with a touch screen includes a cover 10, a capacitive touch panel 20, a liquid crystal panel 30, and an electromagnetic touch panel 40.

Here, the cover 10 is a surface that a touching object touches, and may act as a window of the display device through reinforcement processing. Also, the cover 10 may be formed of glass.

The capacitive touch panel 20 measures capacitive change before and after a touch to determine whether there is a touch and the coordinates of a touched region, and includes a plurality of driving electrodes and a plurality of sensing electrodes for sensing touch when a touch is inputted.

The liquid crystal panel 30 includes a liquid crystal layer formed between two glass substrates. The capacitive touch panel 20 is disposed on the liquid crystal panel 30, and the electromagnetic touch panel 40 is disposed under the liquid crystal panel 30.

An induced current, which is generated with a drawing device such as a stylus or a pen, flows in the electromagnetic touch panel 40, and thus, the electromagnetic touch panel 40 determines whether there is a touch and the coordinates of a touched region. The electromagnetic touch panel 40 includes a plurality of sensing electrodes forming a closed loop and a plurality of driving electrodes forming a closed loop, for generating an electromagnetic field for touch sensing.

However, a related art touch screen that enables capacitive touch sensing and electromagnetic touch sensing has a structure in which the capacitive touch panel 20 is disposed on the liquid crystal panel 30, and the electromagnetic touch panel 40 is disposed under the liquid crystal panel 30. For this reason, in the related art touch screen, the thickness of a product and manufacturing cost increase, and production yield decreases.

Moreover, during touch sensing in the capacitive type, when sensing touch in an electromagnetic type, noise due to a drawing device such as a stylus or a pen is inputted to the capacitive touch panel, and thus, a malfunction occurs in capacitive touch sensing.

Moreover, a driver for driving the capacitive touch panel 20 and a driver for driving the electromagnetic touch panel 40 may be driven at the same time, and thus, power consumption increases.

SUMMARY

Embodiments of the present invention relate to a display device with a touch screen and a method of driving the same. Accordingly, embodiments of the present invention are directed to a display device and method that substantially obviate one or more problems due to limitations and disadvantages of the related art.

An object of embodiments is to provide a touch screen that can commonly use both a capacitive touch panel and an electromagnetic touch panel.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a display device, including: a touch screen configured operate as an electromagnetic touch mode or a capacitive touch mode according to an input touch signal, the touch screen including: a plurality of sensing electrode lines arranged to be separated from each other in a first direction, a plurality of driving electrode lines arranged to be separated from each other in a second direction intersecting the first direction, a plurality of first switches configured to control whether to connect pairs of sensing electrode lines among the sensing electrode lines by turning on or off according to the touch signal, where the pairs of sensing electrode lines are respectively connected in an electromagnetic touch mode, and where the pairs of sensing electrode lines are respectively disconnected in a capacitive touch mode, and a plurality of second switches configured to control whether to connect pairs of driving electrode lines among the driving electrode lines by turning on or off according to the touch signal, where the pairs of driving electrode lines are respectively connected in an electromagnetic touch mode, and where the pairs of driving electrode lines are respectively disconnected in a capacitive touch mode.

In another aspect, there is provided a method of driving a display device including a touch screen including a plurality of sensing electrode lines and driving electrode lines and operating as an electromagnetic touch mode or a capacitive touch mode according to an input touch signal, the method including: determining the input touch signal, controlling whether to connect pairs of sensing electrode lines among the sensing electrode lines, and controlling whether to connect pairs of driving electrode lines among the driving electrode lines, according to the touch signal.

It is to be understood that both the foregoing general description and the following detailed description are examples and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
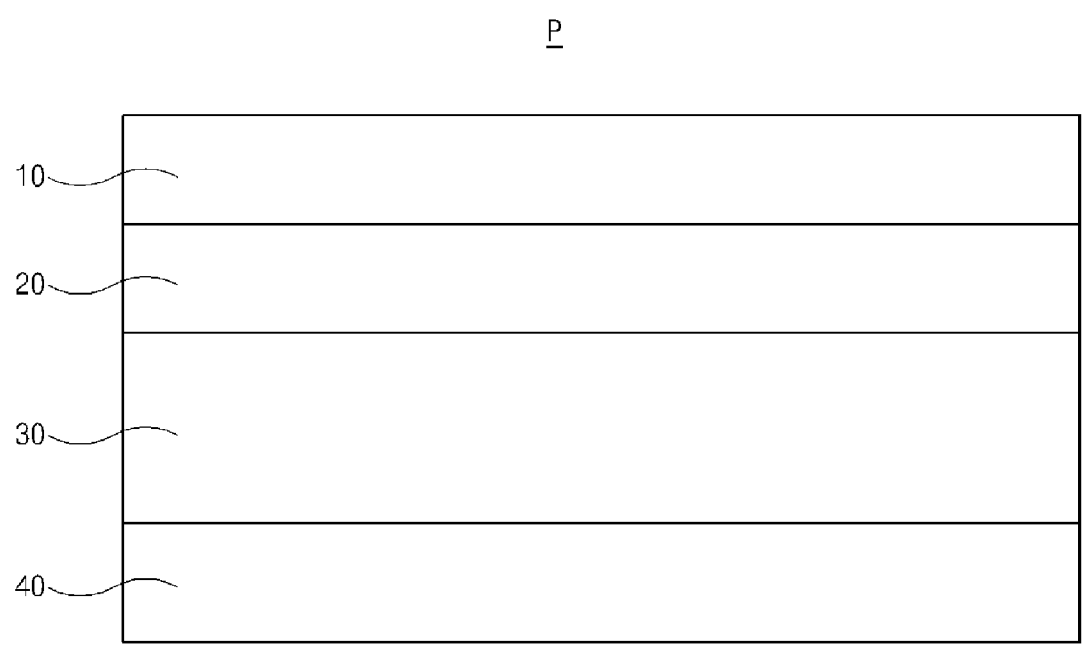
FIG. 1 is a sectional view illustrating a panel part of a related art touch screen.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
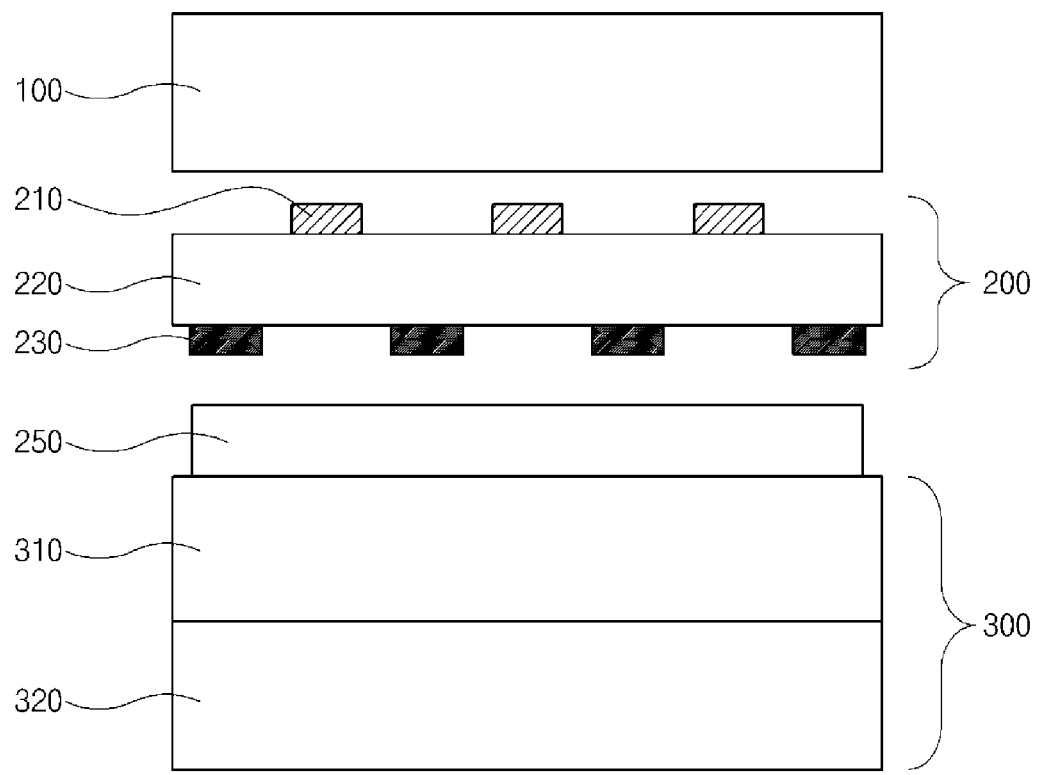
FIG. 2 is a sectional view illustrating a panel part of a display device with a touch screen according to an embodiment.

FIG. 2 is a sectional view illustrating a panel part of a display device with a touch screen according to an embodiment.

As illustrated in FIG. 2, a panel part P of a display device with a touch screen according to an embodiment may include a cover 100, a touch panel 200, and a liquid crystal panel 300.

The cover 100 may be a surface that a touching object touches, and may act as a window of the touch panel 200 through reinforcement processing. Also, the cover 10 may be formed of glass or as an acrylic board. In one example, the cover 100 formed of glass may include a tempered glass. The tempered glass may include, for example, glass that is tempered by compression-deforming a surface of the glass surface, and tension-deforming the inside of the glass through rapid cooling with a compressed cooling air, or glass that is chemically tempered by ion replacement.

The touch panel 200 may include a plurality of sensing electrode strings 210, a film 220, and a plurality of driving electrode strings 230.

In one example, the sensing electrode strings 210 may be arranged to be separated from each other, and the driving electrode strings 230 may be arranged to be separated from each other in a direction intersecting the sensing electrode strings 210. The sensing electrode strings 210 and the driving electrode strings 230 may be insulated from each other with a film or a glass substrate therebetween, and the film or the glass substrate may be additionally formed under the driving electrode strings 230. Also, the sensing electrode strings 210 and the driving electrode strings 230 may be formed to be insulated from each other, in only one side surface of the film or glass substrate.

The touch panel 200 according to an embodiment may enable capacitive touch sensing and electromagnetic touch sensing. For example, by alternately performing capacitive touch sensing and electromagnetic touch sensing, the touch panel 200 may check whether input touch information is electromagnetic touch information or capacitive touch information, and may operate as a capacitive touch panel or an electromagnetic touch panel according to an input touch signal.

In other words, a switch unit may control whether to short-circuit the sensing electrode strings 210 and driving electrode strings 230 of the touch panel 200, and may allow the electrodes to act as capacitive touch electrodes or electromagnetic touch electrodes.

For example, in response to an input touch signal being a capacitive touch signal that is generated with a part of a user's body such as a finger or a palm, the sensing electrode strings 210 and driving electrode strings 230 of the touch panel 200 may be changed to a single electrode string according to a control by the switch unit, and may sense the capacitive change (which may be caused by a finger or a palm) to detect a touched position. In response to an input touch signal being an electromagnetic touch signal that is generated with an input device, such as a stylus or a pen, the sensing electrode strings 210 and driving electrode strings 230 of the touch panel 200 may be changed to a closed-loop electrode string according to a control by the switch unit, and may detect a touched position with the change in an electromagnetic value that may be generated with an input device, such as a stylus or a pen.

The liquid crystal panel 300 may include a color filter substrate 310 and a thin film transistor (TFT) substrate 320. The liquid crystal panel 300 according to an embodiment may include a liquid crystal layer that is formed between the color filter substrate 310 and the TFT substrate 320. A plurality of data lines and a plurality of gate lines intersecting the data lines may be formed in the TFT substrate 320. Also, a plurality of TFTs respectively formed in a plurality of pixel areas defined by intersection between the data lines and the gate lines, a plurality of pixel electrodes for respectively charging data voltages into a plurality of liquid crystal cells, and a storage capacitor connected to each of the pixel electrodes and holding the voltage of a corresponding liquid crystal cell, may be formed. The liquid crystal cells may be arranged in a matrix type due to an intersection structure between the data lines and the gate lines.

A plurality of black matrixes, a plurality of color filters, and a common electrode may be formed in the color filter substrate 310 of the liquid crystal panel 300. In a vertical electric field mode, such as a twisted nematic (TN) mode or a vertical alignment (VA) mode, the common electrode may be formed in the color filter substrate 310. In a lateral electric field mode, such as an in-plane switching (IPS) mode or a fringe field switching (FFS) mode, the common electrode and the pixel electrodes may be formed in the TFT substrate 320.

A column spacer for maintaining a cell gap of the liquid crystal cells may be formed between the color filter substrate 310 and TFT substrate 320 of the liquid crystal panel 300.

The touch panel 200 may be adhered to the liquid crystal panel 300 with an adhesive means 250, which may include an optical clear adhesive (OCA).

Hereinafter, the configuration of the above-described touch screen will be described in detail with reference to FIG. 3.

Figure 3:
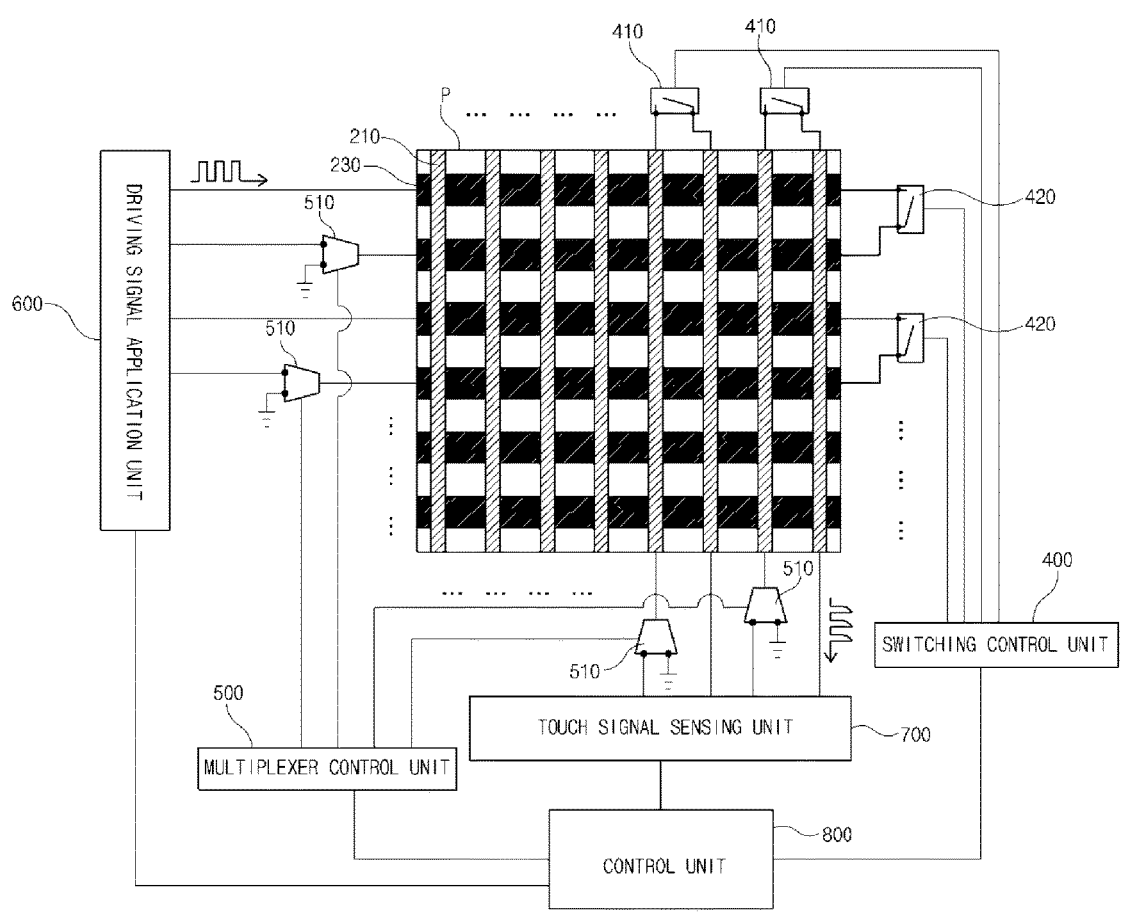
FIG. 3 is a schematic view illustrating a configuration of a display device with a touch screen according to an embodiment.

FIG. 3 is a view illustrating a configuration of a display device with a touch screen according to an embodiment.

The display device with a touch screen according to an embodiment include the panel part P, a switching control unit 400, a plurality of first switches 410, a plurality of second switches 420, a multiplexer control unit 500, a plurality of multiplexers 510, a driving signal application unit 600, a touch signal sensing unit 700, and a control unit 800.

The panel part P, as described above with reference to FIG. 2, may include the cover 100, the touch panel 200, and the liquid crystal panel 300. As illustrated in FIG. 3, the plurality of sensing electrode strings 210 and driving electrode strings 230 may be formed in the touch panel 200 of the panel part P.

The sensing electrode strings 210 may be arranged to be separated from each other in a first direction in the touch panel 200 of the panel part P. The driving electrode strings 230 may be arranged to be separated from each other in a second direction intersecting the first direction in which the sensing electrode strings 210 in the touch panel 200 of the panel part P are formed.

In one example, each of the sensing electrode strings 210 and the driving electrode strings 230 may be formed as a transparent electrode.

The sensing electrode strings 210 may further include a metal wire formed in correspondence with a plurality of sensing electrode strings 210, and the driving electrode strings 230 may further include a metal wire formed in correspondence with a plurality of driving electrode strings. The metal wire may be formed of silver (Ag). Accordingly, a metal wire having low visibility and low resistance may be formed to overlap an electrode string, and thus, electromagnetic radiation efficiency may increase in electromagnetic touch sensing.

In an embodiment, the sensing electrode strings 210 and the driving electrode strings 230 may be illustrated as a straight line, but are not limited thereto. For example, the electrodes of the sensing strings 210 and driving electrode strings 230 may be formed in various shapes such as a pentagon, a tetragon, a hexagon, and a circle, and thus, the sensing electrode strings 210 and the driving electrode strings 230 may have a shape other than a straight line.

The switching control unit 400 may generate a control signal for turning on/off the first switches 410 and the second switches 420 according to a touch signal inputted to the panel part P.

For example, in response to the touch signal inputted to the panel part P being a capacitive touch signal, the switching control unit 400 may generate a control signal that allows the first switches 410 to disconnect each pair of sensing electrode strings, and may allow the second switches 420 to disconnect each pair of driving electrode strings.

For example, in response to the touch signal inputted to the panel part P being an electromagnetic touch signal, the switching control unit 400 may generate a control signal that allows the first switches 410 to connect each pair of sensing electrode strings, and may allow the second switches 420 to connect each pair of driving electrode strings.

The first switches 410 may be turned on/off according to the touch signal inputted to the panel part P, and may control whether to disconnect each pair of sensing electrode strings among the plurality of sensing electrode strings.

For example, in response to the touch signal inputted to the panel part P being a capacitive touch signal, the first switches 410 may disconnect each pair of sensing electrode strings according to a control signal from the switching control unit 400, maintaining a single electrode string type. Also, in response to the touch signal inputted to the panel part P being an electromagnetic touch signal, the first switches 410 may connect each pair of sensing electrode strings according to a control signal from the switching control unit 400, changing a pair of sensing electrode strings into a closed-loop type.

The second switches 420 may be turned on/off according to the touch signal inputted to the panel part P, and may control whether to disconnect each pair of driving electrode strings among the plurality of driving electrode strings.

For example, in response to the touch signal inputted to the panel part P being a capacitive touch signal, the second switches 420 may disconnect each pair of driving electrode strings according to a control signal from the switching control unit 400, maintaining a single electrode string type. Also, in response to the touch signal inputted to the panel part P being an electromagnetic touch signal, the second switches 420 may connect each pair of driving electrode strings according to a control signal from the switching control unit 400, changing a pair of driving electrode strings into a closed-loop type. In response to a driving signal being inputted to the closed-loop driving electrode string, an electromagnetic field may be formed in the closed loop.

In response to a touch signal being a capacitive touch signal, the multiplexer control unit 500 may apply a signal, which may allow a sensing electrode string connected to a plurality of multiplexers 510 to be connected to the driving signal application unit 600, to the plurality of multiplexers 510; and may apply a signal, which may allows a driving electrode string connected to a plurality of multiplexers 510 to be connected to the touch signal sensing unit 700, to the plurality of multiplexers 510.

In response to a touch signal being an electromagnetic touch signal, the multiplexer control unit 500 may apply a signal, which may allow the sensing electrode string connected to the plurality of multiplexers 510 and the driving electrode string connected to the plurality of multiplexers 510 to be connected to a ground terminal, to the plurality of multiplexers 510.

The multiplexers 510 may be connected to the driving signal application unit 600 and a driving electrode string selected from among a pair of driving electrode strings 230, and may be connected to the touch signal sensing unit 700 and a sensing electrode string selected from among a pair of sensing electrode strings 210.

For example, in response to a control signal from the multiplexer control unit 500 being a control signal corresponding to a capacitive touch signal, the sensing electrode string 210 connected to the multiplexers 510 may be connected to the touch signal sensing unit 700, and the driving electrode string 230 connected to the multiplexers 510 may be connected to the driving signal application unit 600.

For example, in response to a control signal from the multiplexer control unit 500 being a control signal corresponding to an electromagnetic touch signal, the sensing electrode string 210 connected to the multiplexers 510 and the driving electrode string 230 connected to the multiplexers 510 may be connected to the ground terminal. In one example, closed-loop sensing electrode strings formed by the first switches 410 may receive sensing signals from the touch sensing signal unit 700 and may supply the sensing signals to the ground terminal, sensing a touched position. Also, closed-loop driving electrode strings formed by the second switches 420 may receive driving signals from the driving signal application unit 600 and may supply the driving signals to the ground terminal, allowing an electromagnetic field to be formed in a closed loop that is formed with the driving electrode string.

In response to an input touch signal being a capacitive touch signal, the driving signal application unit 600 may apply a plurality of touch driving signals for capacitive touch sensing to the plurality of driving electrode strings 230. In response to an input touch signal being an electromagnetic touch signal, the driving signal application unit 600 may apply a plurality of touch driving signals for electromagnetic touch sensing to the plurality of driving electrode strings 230. In one example, the touch driving signal may include a driving current.

In response to a touch driving signal for capacitive touch sensing being applied to the touch signal sensing unit 700, the touch signal sensing unit 700 may sense a change in capacitance (which may occur in the sensing electrode strings 210 and the driving electrode strings 230) and a plurality of input touch signals by using the sensing electrode strings 210 to detect a touched position. In response to a touch driving signal for electromagnetic touch sensing being applied to the touch signal sensing unit 700, the touch signal sensing unit 700 may sense the change in an induced current, which may occur in a plurality of closed-loop driving electrode strings and a plurality of input touch signals by using the plurality of closed-loop sensing electrode strings to detect a touched position.

The control unit 800 may differentiate a capacitive touch sensing type and an electromagnetic touch sensing type with an input touch signal, and may control the driving signal application unit 600 to apply a driving signal based on the differentiated touch sensing type.

Moreover, the control unit 800 may control the touch signal sensing unit 700 to detect a touched position according to a touch sensing type, and may control the operation of the switching control unit 400 and the operation of the multiplexer control unit 500.

Hereinafter, the electromagnetic touch principle and capacitive touch principle of the touch screen according to an embodiment will be described in detail with reference to FIGS. 4A to 4C and FIGS. 5A to 5C.

Figure 4A:
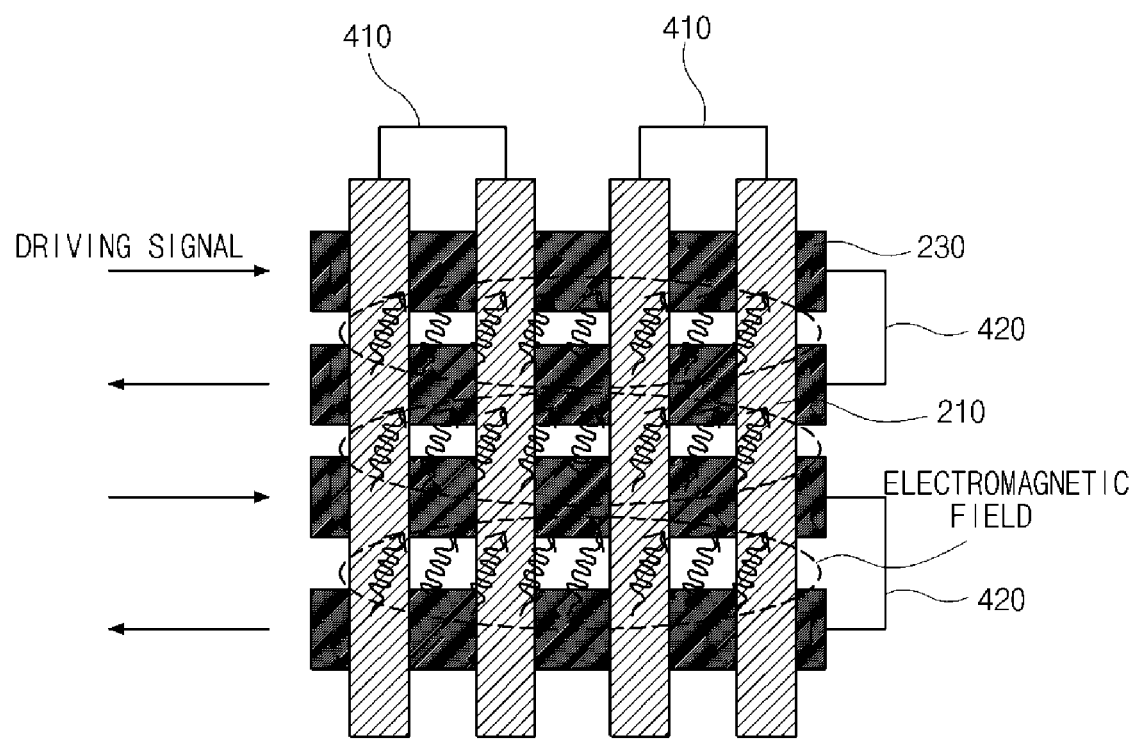
FIGS. 4A to 4C are schematic views for describing the electromagnetic touch sensing principle of the display device with a touch screen according to an embodiment.
Figure 4B:
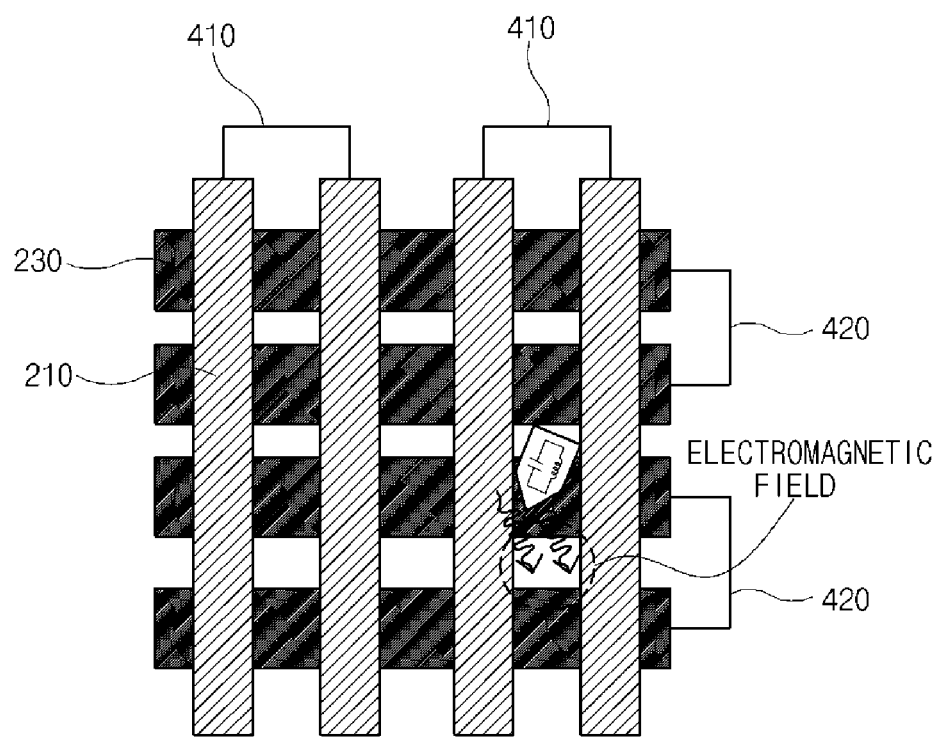
Figure 4C:
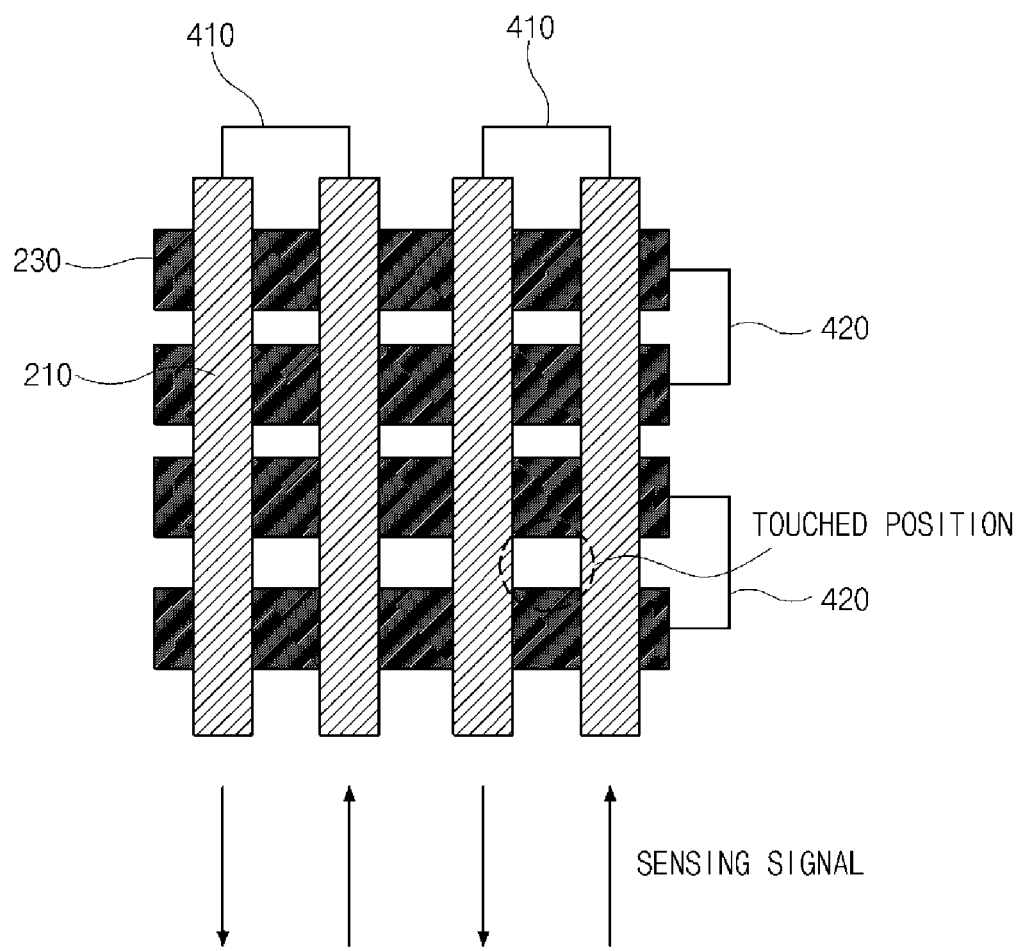

FIGS. 4A to 4C are schematic views for describing the electromagnetic touch sensing principle of the display device with a touch screen according to an embodiment.

By alternately performing electromagnetic touch sensing and capacitive touch sensing, a panel may determine whether input touch information is electromagnetic touch information or capacitive touch information.

As illustrated in FIG. 4A, in response to the driving mode of the panel being an electromagnetic touch driving mode, the first switches 410 may connect a plurality of paired sensing electrode strings 210 in pairs to form the closed-loop sensing electrode strings, and the second switches 420 may connect a plurality of paired driving electrode strings 230 in pairs to form the closed-loop driving electrode strings. Subsequently, an electromagnetic field may be generated by applying a driving signal to the closed-loop driving electrode string. The driving signal may include a driving current.

As illustrated in FIG. 4B, in response to an input device (including a resonance circuit), such as a stylus or a pen, touches a touch panel including closed-loop driving electrode strings, an electromagnetic field that is generated in the closed-loop driving electrode string may be reflected onto the input device, such as the stylus or the pen, and thus, an amplified electromagnetic field may be again inputted to the touch panel.

As illustrated in FIG. 4C, in the touch panel, a plurality of sensing signals may be applied to the closed-loop sensing electrode strings due to an electromagnetic field that may be reflected and amplified by a stylus or the like, and a position at which a capacitive change occurs compared to an initial electromagnetic field may be detected with the sensing signals, determining the detected position as a touched position. The sensing signal may include a sensing current.

Figure 5A:
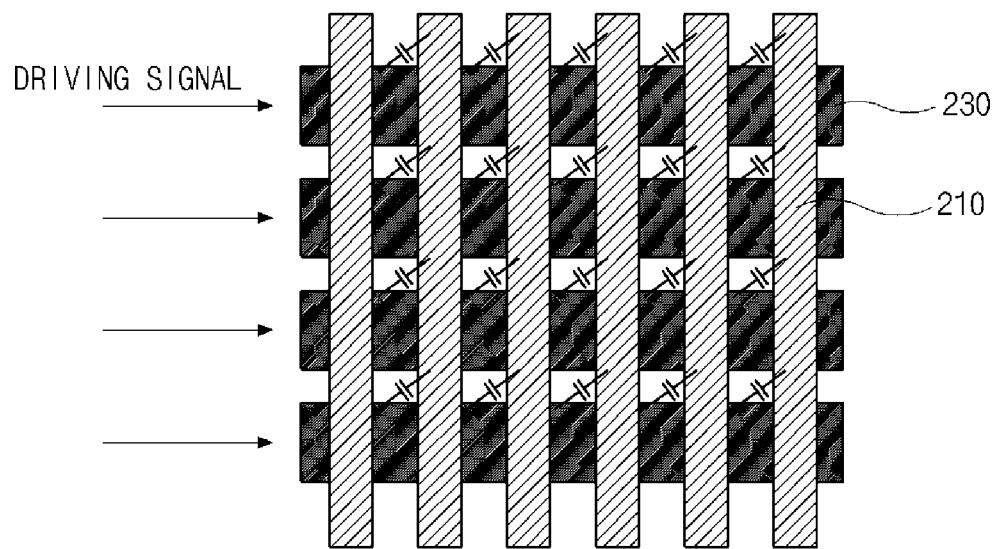
FIGS. 5A to 5C are schematic views for describing the capacitive touch sensing principle of the display device with a touch screen according to an embodiment.
Figure 5B:
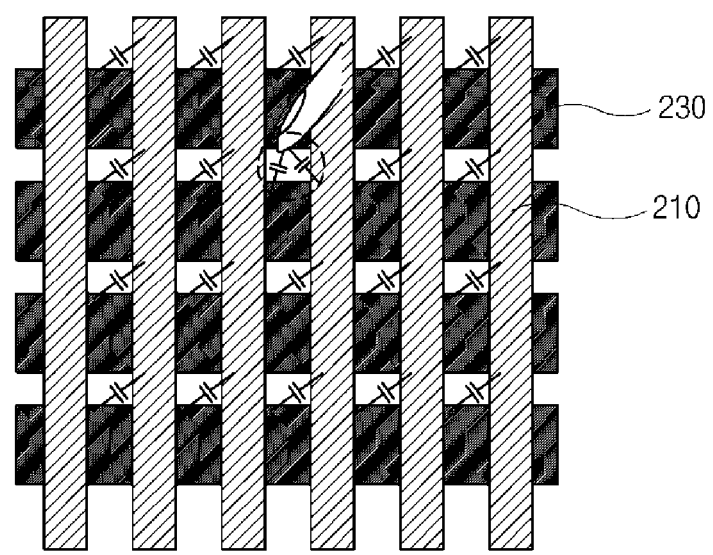
Figure 5C:
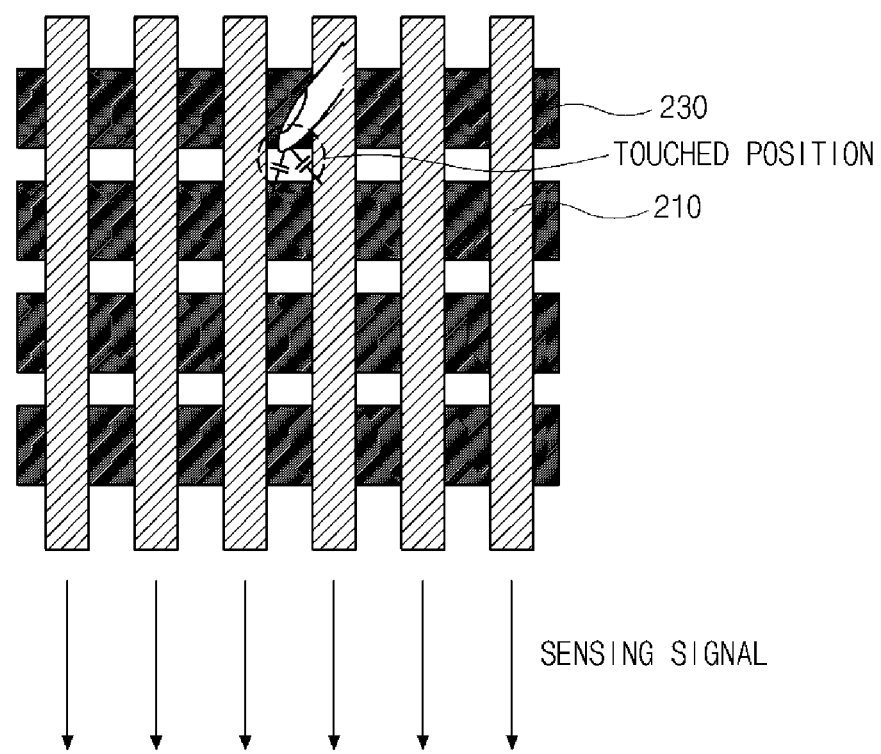

FIGS. 5A to 5C are schematic views for describing the capacitive touch sensing principle of the display device with a touch screen according to an embodiment.

By alternately performing electromagnetic touch sensing and capacitive touch sensing, a panel may determine whether input touch information is electromagnetic touch information or capacitive touch information.

As illustrated in FIG. 5A, in response to the driving mode of the panel being a capacitive touch driving mode, by respectively applying a plurality of driving signals to the plurality of driving electrode strings, capacitances may be generated between the plurality of driving electrode strings 230 and sensing electrode strings 210.

As illustrated in FIG. 5B, in response to a part of a user's body, such as a finger or a palm, touching a touch panel in which a capacitance has been generated, capacitance may be changed in the touched portion of the touch panel. For example, initial capacitances generated between the plurality of driving electrode strings 230 and sensing electrode strings 210 may be changed by a part of the user's body.

As illustrated in FIG. 5C, the sensing electrode strings 210 may overall sense the capacitive change in the touch panel, and may detect the position at which the capacitive change occurs compared to an initial capacitance, determining the detected position as a touched position.

Hereinafter, a panel part of a display device with a touch screen according to an embodiment will be described in detail.

Figure 6:
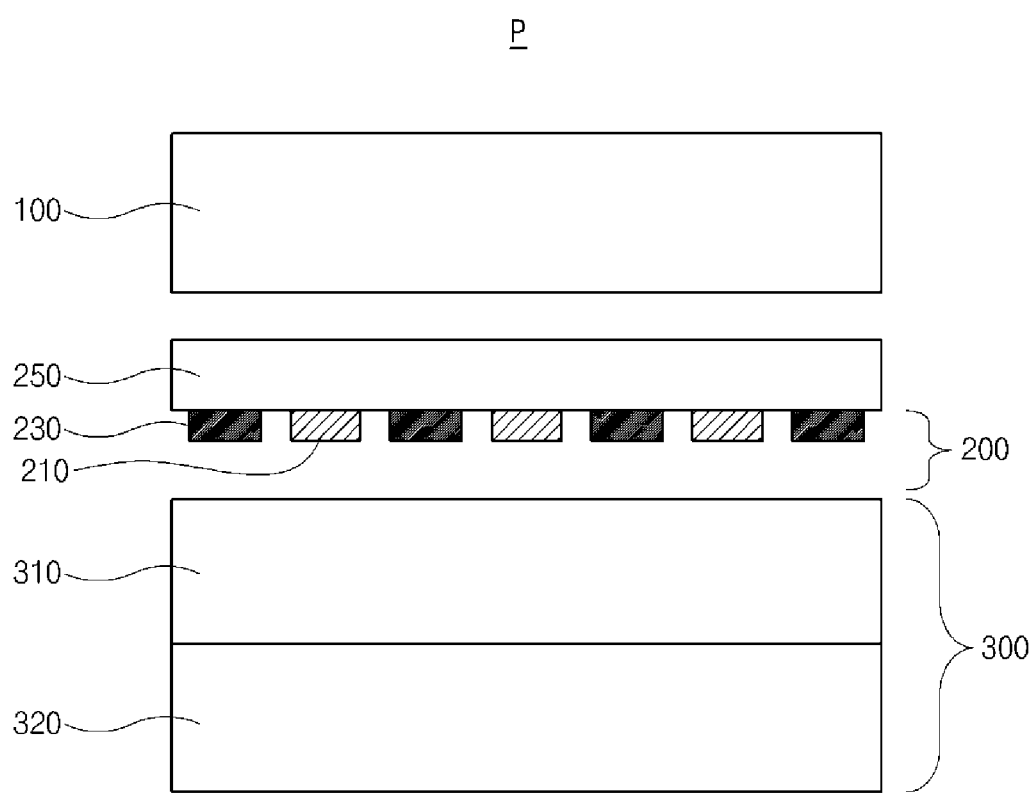
FIG. 6 is a sectional view illustrating a panel part of a display device with a touch screen according to an embodiment.

FIG. 6 is a sectional view illustrating a panel part P of a display device with a touch screen according to an embodiment.

As illustrated in FIG. 6, the panel part P of the display device with a touch screen according to an embodiment may include a cover 100, a touch panel 200, and a liquid crystal panel 300. Here, the cover 100 and the liquid crystal panel 300 have been described above with reference to FIG. 3, and thus are not described below.

The touch panel 200 included in the panel part P of the display device with a touch screen according to an embodiment may include a plurality of sensing electrode strings 210 and a plurality of driving electrode strings 230.

For example, the sensing electrode strings 210 may be arranged to be separated from each other, and the driving electrode strings 230 may be arranged to be separated from each other in a direction intersecting the sensing electrode strings 210. The sensing electrode strings 210 and the driving electrode strings 230 may be insulated from each other, and may be directly formed on the liquid crystal panel 300.

The sensing electrode strings 210 and the driving electrode strings 230 may be adhered to the cover 100 with an adhesive means 250, which may include an OCA.

Figure 7:
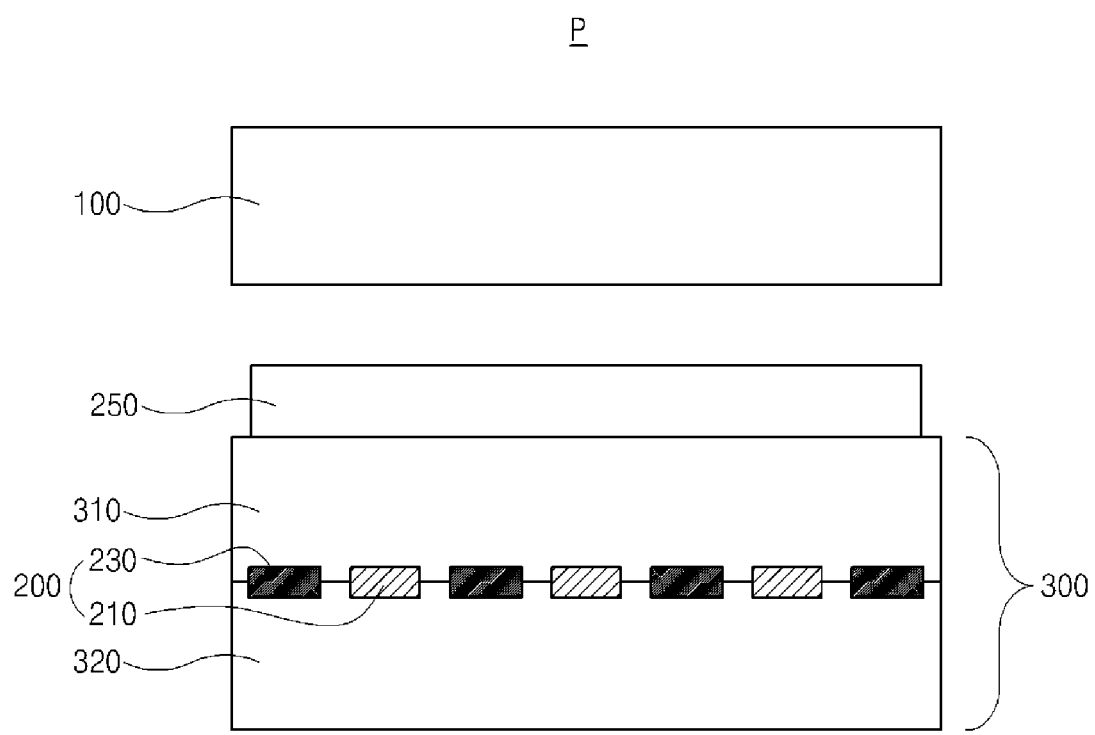
FIG. 7 is a sectional view illustrating a panel part of a display device with a touch screen according to an embodiment.

FIG. 7 is a sectional view illustrating a panel part P of a display device with a touch screen according to an embodiment.

As illustrated in FIG. 7, the panel part P of the display device with a touch screen according to an embodiment may include a cover 100 and a liquid crystal panel 300. In one example, the liquid crystal panel 300 may include a plurality of sensing electrode strings 210 and a plurality of driving electrode strings 230, and a touch panel 200 may be disposed inside the liquid crystal panel 300.

For example, the sensing electrode strings 210 may be arranged to be separated from each other, and the driving electrode strings 230 may be arranged to be separated from each other in a direction intersecting the sensing electrode strings 210. The sensing electrode strings 210 and the driving electrode strings 230 may be insulated from each other and formed between a color filter substrate 310 and a TFT substrate 320.

The liquid crystal panel 300 may be adhered to the cover 100 with an adhesive means 250, which may include an OCA.

Hereinafter, the above-described method of driving the display device with a touch screen will be described in detail with further reference to FIG. 3.

In the method of driving the display device with the touch screen according to an embodiment, the touch screen may include the plurality of sensing electrode strings 210 and the plurality of driving electrode strings 230 and, by alternately performing electromagnetic touch sensing and capacitive touch sensing, the touch screen may determine whether input touch information is electromagnetic touch information or capacitive touch information.

The touch screen may control whether to short-circuit each pair of sensing electrode strings among the plurality of sensing electrode strings 210, and may control whether to short-circuit each pair of driving electrode strings among the plurality of driving electrode strings 230.

For example, in response to an input touch signal being a capacitive touch signal, the touch screen may disconnect each pair of sensing electrode strings among the plurality of sensing electrode strings 210, and may disconnect each pair of driving electrode strings among the plurality of driving electrode strings 230.

To provide a more detailed description, in response to a capacitive touch signal being inputted to the touch screen, the multiplexers 510 may connect the sensing electrode strings, connected to the multiplexers 510, to the touch signal sensing unit 700, and may connect the driving electrode strings, connected to the multiplexers 510, to the driving signal application unit 700.

The plurality of first switches 410 may disconnect the plurality of sensing electrode strings 210, and thus may form a single sensing electrode string in which the plurality of sensing electrode strings 210 are not connected. Also, the plurality of second switches 420 may disconnect the plurality of driving electrode strings 230, and thus may form a single driving electrode string in which the plurality of driving electrode strings 230 are not connected.

The driving signal application unit 600 may apply a plurality of driving signals to the driving electrode strings 230 and thus may allow initial capacitances to be generated between the sensing electrode strings 210 and the driving electrode strings 230.

The touch signal sensing unit 700 may sense the change in the initial capacitance, which may be caused by a touch input applied to the touch panel 200, to detect a touched position in the capacitive touch type.

For example, in response to an input touch signal being an electromagnetic touch signal, the touch signal sensing unit 700 may connect each pair of sensing electrode strings among the sensing electrode strings 210, and may connect each pair of driving electrode strings among the driving electrode strings 230.

To provide a more detailed description, in response to an electromagnetic touch signal being inputted to the touch screen, the multiplexer 510 may connect sensing electrode strings, connected to the multiplexers 510, to the ground terminal, and may connect driving electrode strings, connected to the multiplexers 510, to the ground terminal.

The first switches 410 may connect a plurality of paired sensing electrode strings 210 in pairs, and thus may allow the sensing electrode strings 210 to form closed loops. Also, the second switches 420 may connect a plurality of paired driving electrode strings 230 in pairs, and thus may allow the driving electrode strings 230 to form closed loops.

The driving signal application unit 600 may apply a plurality of driving signals to the plurality of closed-loop driving electrode strings 230, and thus, an electromagnetic field may be generated in the touch panel 200. In one example, the driving signals applied from the driving signal application unit 600 may be supplied to the closed loops connected between the driving signal application unit 600 and the ground terminal, generating the electromagnetic field.

In the touch panel, the touch signal sensing unit 700 may detect the position at which the electromagnetic change occurs due to an electromagnetic field that is reflected and amplified by a stylus or the like, and may determine the detected position as a touched position.

According to embodiments, by commonly using both the driving electrodes and sensing electrodes of the capacitive touch panel and the driving electrodes and sensing electrodes of the electromagnetic touch panel according to an input touch type, the thickness of a product and manufacturing cost can be reduced, and production yield can increase.

Moreover, when sensing touch in the capacitive type, noise due to electromagnetic touch sensing may be prevented from being inputted to the capacitive touch panel, thus preventing malfunction in capacitive touch sensing.

Moreover, power consumption can be reduced by using both the driver for driving the capacitive touch panel and the driver for driving the electromagnetic touch panel as one driver.

It will be apparent to those skilled in the art that various modifications and variations can be made in embodiments of the present invention without departing from the spirit or scope of the invention. For example, although examples of a stylus or pen are described, one skilled in the art would understand that other objects may be used. Thus, it is intended that the present invention cover the modifications and variations of this invention provided they come within the scope of the appended claims and their equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display device, comprising:
   a touch screen configured to operate as an electromagnetic touch mode or a capacitive touch mode based on a touch type of an input touch signal, the touch screen comprising:
      a plurality of sensing electrode lines arranged to be separated from each other in a first direction;
      a plurality of driving electrode lines arranged to be separated from each other in a second direction intersecting the first direction, the plurality of driving electrode lines being further arranged to be physically separated from the plurality of sensing electrode lines;
   a switch control unit configured to control a plurality of first switches and a plurality of second switches, based on a determination of whether the touch type of the input touch signal is either electromagnetic or capacitive,
   wherein, only after when the touch type is determined to be electromagnetic:
      the plurality of first switches are configured to control connection of pairs of sensing electrode lines among the sensing electrode lines by turning on or off, such that the pairs of sensing electrode lines are respectively connected together, and
      the plurality of second switches are configured to control connection of pairs of driving electrode lines among the driving electrode lines by turning on or off, such that the pairs of driving electrode lines are respectively connected together, and
   wherein, only after when the touch type is determined to be capacitive:
      the plurality of first switches are configured to control connection of pairs of sensing electrode lines among the sensing electrode lines by turning on or off, the pairs of sensing electrode lines are respectively disconnected from each other, and
      the plurality of second switches are configured to control connection of pairs of driving electrode lines among the driving electrode lines by turning on or off, such that the pairs of driving electrode lines are respectively disconnected from each other.

2. The display device of claim 1, further comprising a driving signal application unit configured to:
   apply a capacitive touch driving signal to the driving electrode lines in response to the touch type being capacitive; and
   apply an electromagnetic touch driving signal to the driving electrode lines in response to the touch type being electromagnetic.

3. The display device of claim 2, further comprising:
   a touch signal sensing unit configured to:
      sense a capacitively touched position and an electromagnetically touched position;
      in response to the capacitive touch driving signal being applied, detect the capacitively touched position with:
         a change in a capacitance in the sensing electrode lines; and
         the input touch signal; and
      in response to the electromagnetic touch driving signal being applied, detect the electromagnetically touched position with:
         an induced current in the sensing electrode lines; and
         the input touch signal.

4. The display device of claim 3, further comprising:
   a first multiplexer configured to connect the driving signal application unit to a driving electrode line selected from among the pairs of driving electrode lines; and
   a second multiplexer configured to connect the touch signal sensing unit to a sensing electrode line selected from among the pairs of sensing electrode lines.

5. The display device of claim 4, further comprising:
   a multiplexer control unit controlling connection,
   wherein:
      in response to the touch type being capacitive, the multiplexer control unit is configured to:
         apply, to the first multiplexer, a signal which allows a sensing electrode line connected to the first multiplexer to be connected to the touch signal sensing unit, and
         apply, to the second multiplexer, a signal which allows a driving electrode line connected to the second multiplexer to be connected to the driving signal application unit, and
      in response to the touch type being electromagnetic, the multiplexer control unit is further configured to:
         apply, to the first multiplexer, a signal which allows the sensing electrode line connected to the first multiplexer to be connected to a ground terminal, and
         apply, to the second multiplexer, a signal which allows the driving electrode line connected to the second multiplexer to be connected to a ground terminal.

6. The display device of claim 1, further comprising a metal wire disposed in correspondence with the sensing electrode lines and the driving electrode lines.

7. The display device of claim 6, wherein the metal wire comprises silver (Ag).

8. The display device of claim 1, wherein each of the sensing electrode lines and the driving electrode lines comprises a transparent electrode.

9. The display device of claim 5, further comprising a control unit configured to:
   control the driving signal application units, the touch signal sensing unit, the switching control unit, and the multiplexer control unit;

determine the capacitive touch type and the electromagnetic touch type, based on the input touch signal;

control the driving signal application unit to apply a driving signal, based on the determined touch type;

control the touch signal sensing unit to detect the touched position; and control an operation of the switching control unit and an operation of the multiplexer control unit, based on the determined touch type.

10. A method of driving a display device comprising a touch screen comprising a plurality of sensing electrode lines and driving electrode lines and operating as an electromagnetic touch mode or a capacitive touch mode based on a touch type of an input touch signal, and a switch control unit, the method comprising:

determining whether the touch type of the input touch signal is either electromagnetic or capacitive;

wherein, only after when the touch type is determined to be electromagnetic:

the plurality of first switches control connection of pairs of sensing electrode lines among the sensing electrode lines by turning on or off, such that the pairs of sensing electrode lines are respectively connected together, and the plurality of second switches control connection of pairs of driving electrode lines among the driving electrode lines by turning on or off, such that the pairs of driving electrode lines are respectively connected together, and wherein, only after when the touch type is determined to be capacitive:

the plurality of first switches control connection of pairs of sensing electrode lines among the sensing electrode lines by turning on or off, the pairs of sensing electrode lines are respectively disconnected from each other, and the plurality of second switches control connection of pairs of driving electrode lines among the driving electrode lines by turning on or off, such that the pairs of driving electrode lines are respectively disconnected from each other.

11. A method of operating a touch screen configured operate as an electromagnetic touch mode or a capacitive touch mode based on a touch type of an an input touch signal, the touch screen comprising a plurality of sensing electrode lines arranged to be separated from each other in a first direction and a plurality of driving electrode lines arranged to be separated from each other in a second direction intersecting the first direction, the plurality of driving electrode lines being further arranged to be physically separated from the plurality of sensing electrode lines, and a switch control unit, the method comprising:

determining, at the touch panel, whether the touch type of the input touch signal is either electromagnetic or capacitive;

controlling, by the switch control unit, a plurality of first switches and a plurality of second switches, based on the determination of the type of the input touch signal;

only after when the touch type is determined to be electromagnetic:

the plurality of first switches control connection of pairs of sensing electrode lines among the sensing electrode lines by turning on or off, such that the pairs of sensing electrode lines are respectively connected together, and the plurality of second switches control connection of pairs of driving electrode lines among the driving electrode lines by turning on or off, such that the pairs of driving electrode lines are respectively connected together, and only after when the touch type is determined to be capacitive:

the plurality of first switches control connection of pairs of sensing electrode lines among the sensing electrode lines by turning on or off, the pairs of sensing electrode lines are respectively disconnected from each other, and the plurality of second switches control connection of pairs of driving electrode lines among the driving electrode lines by turning on or off, such that the pairs of driving electrode lines are respectively disconnected from each other.

12. The method of claim 11, further comprising:

applying, by a driving signal application unit, a capacitive touch driving signal to the driving electrode lines in response to the touch type being capacitive; and applying, by the driving signal application unit, an electromagnetic touch driving signal to the driving electrode lines in response to the touch type being electromagnetic.

13. The display device of claim 11, further comprising:

sensing, by a touch signal sensing unit, a capacitively touched position and an electromagnetically touched position;

in response to the capacitive touch driving signal being applied, detecting, the touch signal sensing unit, the capacitively touched position with:

a change in a capacitance in the sensing electrode lines; and the input touch signal; and in response to the electromagnetic touch driving signal being applied, detecting, by the touch signal sensing unit, the electromagnetically touched position with: an induced current in the sensing electrode lines; and the input touch signal.

14. The method of claim 13, further comprising:

connecting, by a first multiplexer, the driving signal application unit to a driving electrode line selected from among the pairs of driving electrode lines; and connecting, by a second multiplexer, the touch signal sensing unit to a sensing electrode line selected from among the pairs of sensing electrode lines.

15. The method of claim 14, further comprising:

a multiplexer control unit controlling connection, wherein:

in response to the touch type being capacitive, the multiplexer control unit:

applies, to the first multiplexer, a signal which allows a sensing electrode line connected to the first multiplexer to be connected to the touch signal sensing unit, and applies, to the second multiplexer, a signal which allows a driving electrode line connected to the second multiplexer to be connected to the driving signal application unit, and in response to the touch type being electromagnetic, the multiplexer control unit:

applies, to the first multiplexer, a signal which allows the sensing electrode line connected to the first multiplexer to be connected to a ground terminal, and applies, to the second multiplexer, a signal which allows the driving electrode line connected to the second multiplexer to be connected to a ground terminal.

16. The method of claim 11, further comprising forming a metal wire in correspondence with the sensing electrode lines and the driving electrode lines.

17. The method of claim 16, wherein the metal wire comprises silver (Ag).

18. The method of claim 11, wherein each of the sensing electrode lines and the driving electrode lines comprises a transparent electrode.

19. The method of claim 11, further comprising a control unit which:
- controls the driving signal application units, the touch signal sensing unit, the switching control unit, and the multiplexer control unit;
- determines the capacitive touch type and the electromagnetic touch type based on the input touch signal;
- controls the driving signal application unit to apply a driving signal, based on the determined touch type;
- controls the touch signal sensing unit to detect the touched position; and
- controls an operation of the switching control unit and an operation of the multiplexer control unit, based on the determined touch type.

* * * * *